United States Patent
Muenster et al.

(10) Patent No.: US 6,773,039 B2
(45) Date of Patent: Aug. 10, 2004

(54) PLUG-IN COUPLING

(75) Inventors: Wilfried Muenster, Heidelberg (DE); Oliver Luz, Mannheim (DE); Peter Friedrich, Lampertheim (DE)

(73) Assignee: Friatec Aktiengesellschaft, Mannheim (DE)

( * ) Notice: Subject to any disclaimer, the term of this patent is extended or adjusted under 35 U.S.C. 154(b) by 0 days.

(21) Appl. No.: 10/000,800

(22) Filed: Dec. 4, 2001

(65) Prior Publication Data

US 2002/0163191 A1 Nov. 7, 2002

Related U.S. Application Data

(63) Continuation of application No. PCT/EP00/05027, filed on May 31, 2000.

(30) Foreign Application Priority Data

Jun. 4, 1999 (DE) .......................................... 199 25 640
Jun. 7, 1999 (DE) .......................................... 199 25 716

(51) Int. Cl.[7] ............................................... F16L 37/12
(52) U.S. Cl. ....................... 285/259; 285/255; 285/242; 285/342; 285/339
(58) Field of Search ............................. 285/382, 382.2, 285/339, 342, 321, 242, 249, 255, 259

(56) References Cited

U.S. PATENT DOCUMENTS

| | | | |
|---|---|---|---|
| 2,702,202 A | | 8/1955 | Kaiser et al. |
| 3,064,983 A | | 11/1962 | Halterman et al. |
| 3,719,375 A | * | 3/1973 | Nordin .................... 285/339 |
| 4,564,222 A | * | 1/1986 | Loker et al. ............... 285/243 |
| 4,606,559 A | | 8/1986 | Rammelsberg |
| 4,705,304 A | * | 11/1987 | Matsuda et al. ............ 285/243 |
| 4,775,173 A | * | 10/1988 | Sauer .................... 285/148.14 |
| 4,890,866 A | | 1/1990 | Arp |
| 5,102,170 A | * | 4/1992 | Inoue ....................... 285/23 |
| 5,112,087 A | * | 5/1992 | Haruki ..................... 285/101 |
| 5,332,269 A | * | 7/1994 | Homm ...................... 285/39 |
| 5,558,375 A | * | 9/1996 | Newman .................... 285/23 |
| 5,692,785 A | | 12/1997 | Wartluft et al. |

FOREIGN PATENT DOCUMENTS

| | | |
|---|---|---|
| DE | 2413750 | 11/1974 |
| DE | 3518788 | 5/1986 |
| DE | 4441373 | 5/1996 |
| DE | 19524934 | 1/1997 |
| DE | 19625687 | 5/1997 |
| DE | 29701223 | 5/1997 |
| DE | 19654435 | 7/1998 |
| DE | 29901935 | 4/1999 |
| DE | 19814708 | 5/1999 |
| EP | 0474335 | 3/1992 |
| EP | 0587131 | 3/1994 |
| FR | 2409445 | 11/1977 |
| GB | 1007245 | 10/1965 |
| GB | 1464743 | 2/1977 |
| GB | 2257764 | 1/1993 |
| JP | 0010110870 | 4/1998 |

* cited by examiner

*Primary Examiner*—David Bagnell
*Assistant Examiner*—G M Collins
(74) *Attorney, Agent, or Firm*—Crowell & Moring LLP

(57) ABSTRACT

A plug-in coupling having a base body (6), a sealing ring (12, 13), a locking ring (40) and an annular body which can be connected to the base body (6). A pipe end (4, 5) can be locked in position by the locking ring (40). The plug-in coupling of the invention enables a connection to be made with at least one pipe end in a simple, functionally reliable manner, in such a way that pipes made of different materials can be used together. The pipe ends (4, 5) can be inserted into an axial annular gap or space (27) between the base body (6) and the annular body (18, 19) in such a way that the sealing ring (12) lies adjacent the interior of the pipe end (4, 5), making a good seal with the pipe end, and also in such a way that the locking ring (40) is located in the annular gap (27). The locking ring (40) is prestressed and adjoins the locking surface (20) of the annular body (18) on one side and the exterior surface of the inserted pipe end (4, 5) on the other side. In addition a locking ring (40) is situated in the annular gap (27) which is prestressed and adjoins the locking surface (20, 21) of the annular body (18, 19) on one side and the exterior surface of the inserted pipe end (4, 5) on the other.

57 Claims, 6 Drawing Sheets

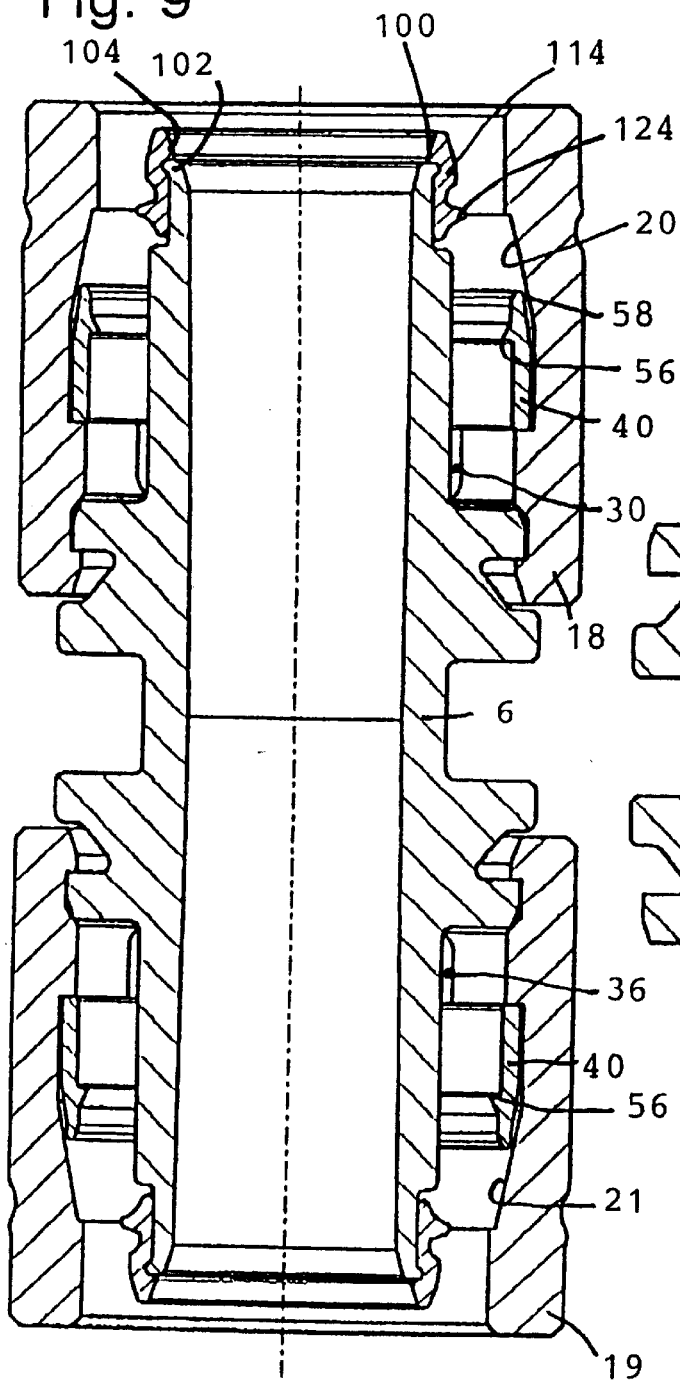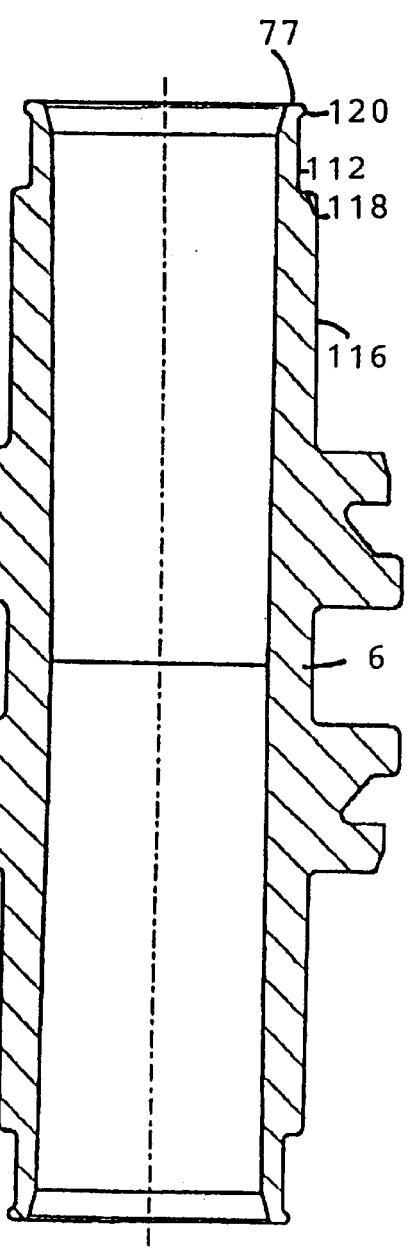

PLUG-IN COUPLING

CROSS REFERENCE TO RELATED APPLICATIONS

This application is a continuation of international patent application no PCT/EP00/05027, filed May 31, 2000, designating the United States of America, the entire disclosure of which is incorporated herein by reference. Priority is claimed based on Federal Republic of Germany patent application nos. DE 199 25 640.3, filed Jun. 4, 1999, and DE 199 25 716.7, filed Jun. 7, 1999.

BACKGROUND OF THE INVENTION

The invention relates to a plug-in coupling comprising a base body, a sealing ring, a locking ring, and an annular body connectable with the base body, in which a pipe end can be locked in position by the locking ring.

European Patent Application No. EP 587,131 describes such a plug-in coupling, which is constructed as a double coupling and comprises a base body and a holding device or locking device for the corresponding ends of the pipes to be connected, which can be inserted into the coupling body. The holding device comprises a locking ring, which has a locking cone on the outside and at least one locking rib on the inside, which can engage with the corresponding pipe end. By means of a union nut, which can be screwed onto the coupling body, an opposite cone can be locked in position using said locking ring. Furthermore, along the interior of the coupling body, a sealing ring is provided, which fits tightly against the exterior surface of the inserted pipe end.

The pipe end must have sufficient rigidity, so that it does not yield toward the interior due to the radial locking force components, which would jeopardize the axial fixation of the pipe end within the plug-in coupling. When the connection is established, care must be taken that the pipe end is inserted far enough into the coupling body, so that the locking ring as well as the sealing ring can perform their function. If the pipe end is incompletely inserted into the plug-in coupling, there is a risk that the connection is either not being made at all or is being made incorrectly. Furthermore, especially in pressure pipes, there is the problem that the pipe end may be partially moved out of the plug-in coupling due to relative movements of the pipe end in relation to the plug-in coupling, so that the required seal and/or axial fixation can no longer be assured.

SUMMARY OF THE INVENTION

It is the object of the invention to provide an improved plug-in coupling for connecting pipes with which a connection can be made with at least one pipe end with little effort and high functional reliability.

Another object of the invention is to provide a plug-in coupling which permits functionally suitable handling during mounting.

A further object of the invention is to provide a plug-in coupling which prevents mounting errors in coupling installation.

It is also an object of the invention to provide a plug-in coupling which is equally suitable for pipes of different materials, such as plastic or metal or a composite thereof (composite pipes made of plastic with a metal interlayer).

A still further object of the invention is to provide a plug-in coupling which can provide a secure connection over many years even for comparatively soft materials, particularly polyethylene, for example.

Yet another object of the invention is to provide a plug-in coupling which is especially suitable for plumbing applications, particularly for hot water and cold water installations.

An additional object of the invention is to provide a plug-in coupling which can reliably absorb any changes in the material, especially with respect to dimensions or rigidity, resulting particularly from temperature changes of the flowing medium.

These and other objects of the invention have been achieved by providing a plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end.

The plug-in coupling according to the invention is characterized by a functionally reliable design and little complexity in production and assembly. The base body, which partly engages with the interior of the pipe end, assures secure radial support of the pipe end, so that the locking forces of the holding means are reliably absorbed and transmitted even under changing operating conditions. An annular body or cap, which radially surrounds the exterior of the pipe end, is coupled together with the base body. The pipe end is locked into position in an annular space between the base body and the cap. The interior surface of the annular body or the cap is preferably conical.

The locking ring, which is coupled on either side in a non-positive and/or a positive fit with both the interior surface of the annular body and the exterior surface of the pipe, is arranged between said interior surface of the annular body and the exterior surface of the pipe end. The sealing element is preferably arranged on the portion of the base body that engages with the pipe end and fits tightly against the interior surface of the pipe end. The locking or holding ring has at least one holding claw each radially on the inside and radially on the outside, which claws are respectively pressed into the exterior surface of the pipe end and into the interior surface of the annular body.

In one specific embodiment of the invention, the locking ring comprises at least one additional integrally formed clamping element, which is used to produce initial stress on the pipe in the mounted state. This improves and/or accelerates claw fixation of the pipe. The cap comprises at least one projection and/or annular collar associated with the locking ring and/or the clamping element to support the clamping element or the locking ring. The clamping element is seated against the annular collar such that the locking ring preferably contacts the corresponding locking surface of the cap under initial stress. When the pipe end is inserted into the plug-in coupling, the locking ring can yield in axial direction against the prestressing force of the clamping element, while the insertion resistance preferably remains essentially unchanged.

After complete insertion of the pipe end, the locking ring is pressed against the especially conical locking surface of the cap or the annular body by means of the clamping element, so that the pipe end is quickly and securely fixed in the plug-in coupling. Manufacturing tolerances of the plug-in coupling, particularly of the annular body and the locking ring, are thus compensated just as reliably as manufacturing tolerances of the pipe end and particularly its outside diameter. There is no risk that the locking ring mounted inside the cap will already be radially deformed to such an extent that the pipe end can be inserted into the plug-in coupling only by overcoming a large insertion resistance. Advantageously, several, preferably three, such elastic clamping elements are provided. They are connected with the locking ring along one of its axial end faces, particularly via short ribs oriented in substantially axial direction, and form an integral unit with the locking ring. The cap or the annular body preferably comprises radially inwardly pointing projections that can engage with the clamping element to produce radial prestressing and reliable claw fixation and bracing with the pipe end, which is inserted into the plug-in coupling.

Advantageously, the cap or the annular body is provided with at least one inspection window, which is designed particularly in the form of a radial port or opening or an at least partially transparent area. This makes it possible to check at any time by visual inspection whether the pipe end is properly inserted into the plug-in coupling, particularly up to a predefined limit stop. This visual inspection is simple to perform either during or after assembly, including after prolonged operation, so that any impending detachment of the connection can be detected at any time and suitably corrected. The cap is preferably made of a completely transparent material; production problems are avoided due to the one-piece design.

Furthermore, the cap can have at least one transparent window for visual inspection. In this case, the entire cap is advantageously made of a transparent material, which is dyed or provided with a coat of paint on the inside of the cap, except for the inspection window or windows. In addition, or as an alternative, in the context of the invention, the cap can have at least one radially continuous opening or port to permit verification from the outside at any time that the pipe end has been fully and properly inserted into the plug-in coupling. In case of improper assembly, the area of the face of the pipe end is not located radially inside the area of the inspection window or said opening, so that an improper connection can be readily detected.

In a further embodiment of the invention, the sealing ring and the base body comprise holding elements, annular grooves or the like that correspond and engage with one another and/or adjoin one another to fix the sealing ring axially on the base body. As a result, as the pipe end is inserted into the plug-in coupling, the sealing ring maintains its predefined position and any unacceptable pushing of the sealing ring into the plug-in coupling or damage to the sealing ring is avoided. The sealing ring advantageously contains at least one sealing bead or a sealing lip, which can be brought into contact with the interior surface of the associated pipe end. In this case the base body is also arranged within the pipe end.

Also within the scope of the invention, the sealing ring can be arranged or embodied in such a way that it can be brought into contact with the exterior surface of the pipe end. In this case, the base body radially surrounds the exterior of the pipe end in the manner of a sleeve. By means of suitable coupling elements, such as locking rings or clamping rings, particularly provided with holding claws, the pipe end is fixed in the plug-in coupling in a non-positive and/or positive fit.

Particularly advantageously, the sealing ring is arranged in an annular groove provided in the exterior surface of the base body. Between the annular groove and the free end of the base body, the base body contains a ring by means of which the sealing ring is secured against any unintended dislodging or shifting as the pipe end is inserted. The ring is a functionally reliable protection against dislodging of the sealing ring, which fits against the interior surface of the pipe end to form a seal when the pipe end is further inserted. Particularly advantageously, the sealing ring is flat, i.e., its radial thickness is substantially smaller than its axial length. The radial wall thickness of the portion of the base body that together with said sealing ring lies inside the pipe end can thus be designed comparatively small, which ultimately results in an optimized inside diameter of the base body and minimizes the reduction of area.

It should be noted that the plug-in coupling according to the invention can form part of a fitting for connecting two or more pipes, e.g., in the form of an elbow, a wall plate or a T-piece. It can also form a component of the housing of a valve, a transition piece between pipes made of different materials, or the like. When constructed as a fitting or a double coupling to connect two or more pipes, the pipe axes can be positioned at any angle in relation to each other. It should also be expressly noted that the plug-in coupling is particularly suitable for pipes made of different materials and/or with different material properties.

Specific embodiments and further refinements of the invention are set forth in the dependent claims as well as in the following detailed description.

BRIEF DESCRIPTION OF THE DRAWINGS

The invention will be described in further detail hereinafter with reference to illustrative preferred embodiments shown in the accompanying drawings, in which:

FIGS. 9 and 10 are longitudinal sections of another specific illustrative embodiment of the plug-in coupling of the invention;

DETAILED DESCRIPTION OF PREFERRED EMBODIMENTS

Figure 1:
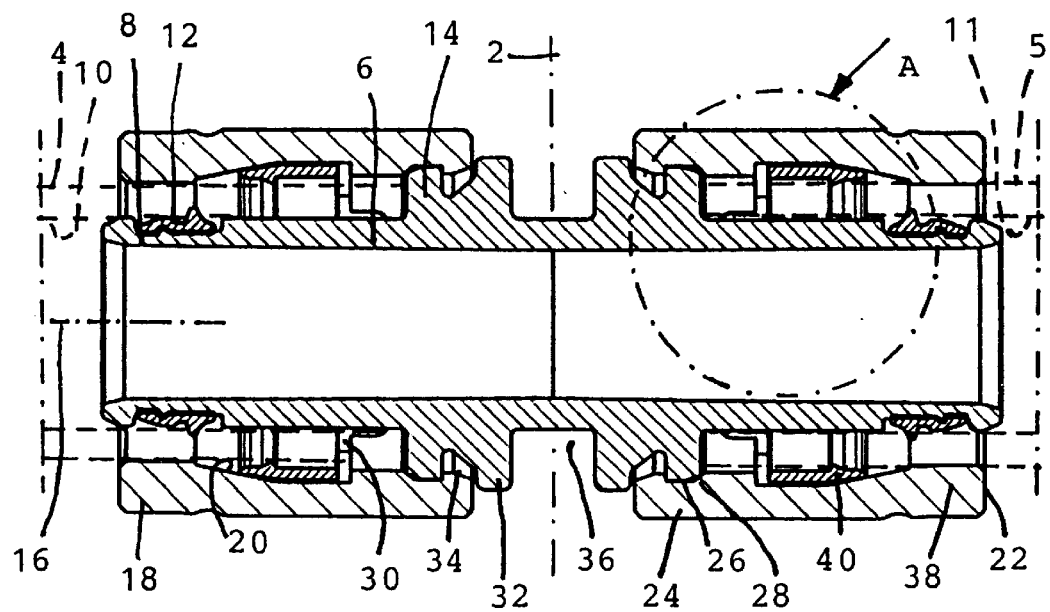
FIG. 1 is a longitudinal section through the plug-in coupling for connecting two pipe ends.

The plug-in coupling according to FIG. 1 is designed as a double coupling and is symmetrical with respect to the center axis 2 and serves to connect two pipe ends 4, 5. The following description applies correspondingly to the two parts of the plug-in coupling, which are symmetrical to each other. The plug-in coupling comprises a base body 6, which is partially inserted, respectively, into the two pipe ends 4, 5. The inner end areas 8 of the base body 6 are preferably formed as conical expansions oriented radially outwardly toward the interior surfaces 10, 11 of the corresponding pipe ends 4, 5.

In addition, a sealing ring 12, arranged particularly in an annular groove of the exterior surface of the base body 6, fits against the corresponding interior surface 10, 11 so as to form a seal. The base body 6 further comprises a first radially outwardly directed rib 14, which serves as a limit stop for the face of the pipe end 4 or 5 which is inserted into the plug-in coupling. This rib 14 is preferably formed as a circumferential closed ring relative to the longitudinal axis 16, but can also be divided into a plurality of segments.

Furthermore, a cap or an annular body 18 is provided, which surrounds the respective pipe end 4, 5 along the exterior. On the interior, the annular body 18 comprises a preferably conical locking surface 20, whose inside diameter decreases in the direction pointing away from the base body or toward the free end 22 of the corresponding annular body 18. The cap or annular body 18 further comprises a connecting element 24, which engages with the first rib 14. The rib 14 thus performs a dual function, acting as a limit stop for the pipe end and fixing the annular body 18. Advantageously, the connecting element 24 comprises an annular groove 26 in which the radially outer margin 28 of the first rib 14 engages.

The annular body 18, particularly its connecting element 24, overlaps the face of the inserted pipe end in axial direction away from the free end of the base body 6 and, furthermore, especially annularly overlaps the outer edge of the first rib 14. In addition, it can preferably be divided into a plurality of segments. At least the connecting element 24 can be elastically deformed in such a way that for assembly it can be pushed over the outer rim of the first rib 14 to assume the locked position relative to the base body 6 as shown in the drawing. Particularly advantageously, the annular body 18 and the base body 6 are assembled or connected at the factory in such a way that prior to insertion of the pipe end, an annular gap or space 27 is present between the base body 6 lying on the inside and the annular body 18 lying on the outside. When the plug-in coupling is connected with the pipe end 4, 5, the pipe end can be axially pushed into this gap.

In the illustrated embodiment, the annular body 18 is permanently and non-detachably connected with the base body 6 by means of the connecting elements 24. Alternatively and within the scope of the invention, this connection can be detachable, in which case the connecting elements may be provided, for example, with an internal thread, which engages a corresponding external thread of the base body. Also within the scope of the invention, other connections, e.g., bayonet-type connections, may be provided.

The annular body 18 includes an inspection window 30 and/or is transparent at least in the area of the rib 14 or the limit stop for the pipe end to make the radially inner face of the pipe end 4 or 5, or the portion adjacent thereto, visible from the outside. This permits visual inspection, so that a possibly incomplete insertion of the pipe end during assembly or any subsequent partial detachment of the pipe end can be readily detected. Advantageously, a plurality of these inspection windows is distributed over the circumference of the annular body 18, particularly in the form of radial ports or openings, so that visual inspection is readily possible from practically any side. In an alternative embodiment, the entire annular body 18 is made of a transparent material, particularly of synthetic resin material (i.e., plastic). The inspection window 30 according to the invention is provided outside the interior area of the plug-in coupling that is sealed by means of the sealing ring.

Axially adjacent to the inspection window or windows 30, away from the free end of the base body 6, the connecting element or elements 24 of the invention is or are provided to connect the annular body 18 with the base body 6. The base body furthermore comprises a second rib 32, which is spaced axially from the first rib 14, such that the annular body 18 with a radially inwardly pointing hook-shaped extension 34 engages with the annular space 35 between the ribs 14 or 32 to fix the annular body 18 on the base body 6. The second radial rib 32 serves as an insertion limit for the annular body 18 when it is mounted to the base body 6. In the double coupling embodiment shown here, there is an annular groove 36 in the base body 6 between the two ribs 32, which are axially spaced apart. This annular groove 36 can serve as an engaging means, e.g., a hexagon, for a tool used to produce the connection with the annular body 18 or the pipe end 4, 5.

As may be seen from the drawing, the free end 22 of annular body 18 has an area 38 with a defined axial length within which the sealing ring 12 is arranged. With this area 38, the annular body 18 fits at least approximately against the exterior surface of the respective inserted pipe end 4, 5. The interior surface of the annular body 18 is preferably cylindrical in this area 38 and thus assures secure radial support of the pipe end and, consequently, a secure seal by means of the radially inwardly located sealing ring 12.

Figure 2:
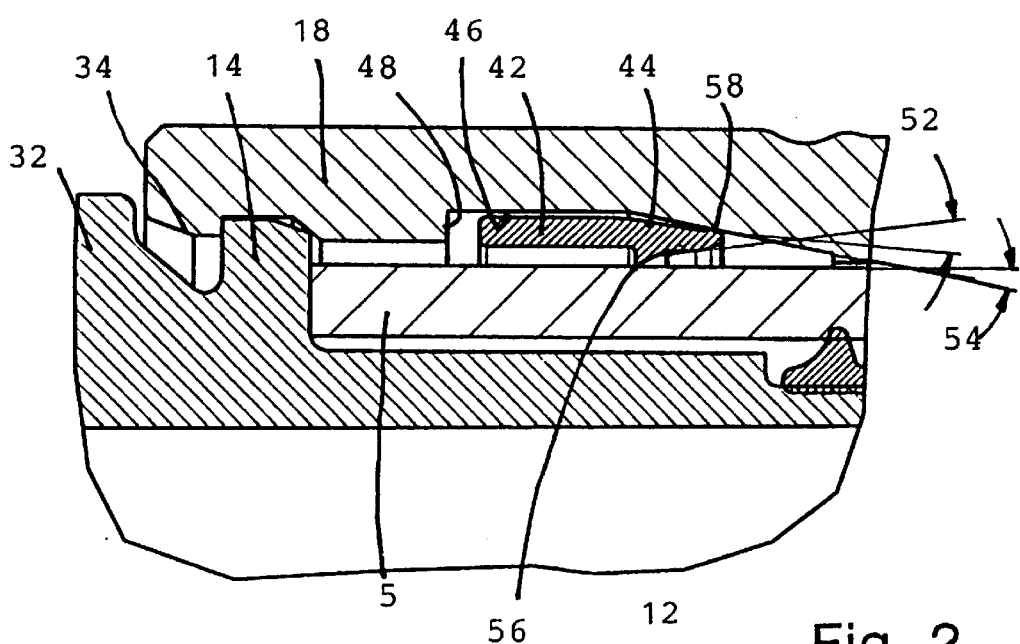
FIG. 2 is an enlarged detail A according to FIG. 1.

As may be seen in the enlarged detail view according to FIG. 2, a locking ring 40 is arranged radially between the annular body 18 and the pipe end 5. This locking ring 40 particularly advantageously comprises a first part 42 and a second annular part 44. The first cylindrical part 42 is adjacent to the first rib 14 and advantageously has a cylindrical interior surface and/or a cylindrical exterior surface. In the area of the first part 42, the interior surface 46 of the annular body 18 is advantageously also substantially cylindrical. Furthermore, the annular body 18 has an annular collar 48, partially opposite which an axial end face of the locking ring 40, or its first part 42, is provided.

According to the invention, the second part 44 is wedge-shaped, with its thickness tapering in the direction toward the free end of the plug-in coupling. As described above, the locking surface 20 of the annular body 18 preferably tapers conically. The second part 44 preferably has a likewise conical exterior surface to fit against the locking surface 20. The exterior surface of the second locking ring part 44 and its interior surface intersect at a first aperture angle 52. In contrast, the locking surface 20 intersects the exterior surface of the inserted pipe end 5 at a second aperture angle 54. The locking ring 40 according to the invention has a radially inwardly pointing holding or cutting claw 56, which advantageously is ring-shaped and which is pressed into the exterior surface of the pipe end 5.

Advantageously, the locking ring 40 furthermore has at least one radially outwardly pointing second holding claw 58, which is pressed into the locking surface 20. Due to their substantially linear engagement with the exterior surface of the pipe end 5 and/or the inner locking surface of the annular body 18, the preferably annular holding claw or claws 56, 58, assure high pressure per unit area and ultimately securely lock the pipe end 5 against axial forces which otherwise might pull it out of the plug-in coupling. Since said first aperture angle 52 according to the invention is greater than said second aperture angle 44, the holding claws 56, 58 are particularly effective. These radially inwardly or radially outwardly directed holding claws 56, 58 are simple to produce and assure high pressure per unit area.

Figure 3:
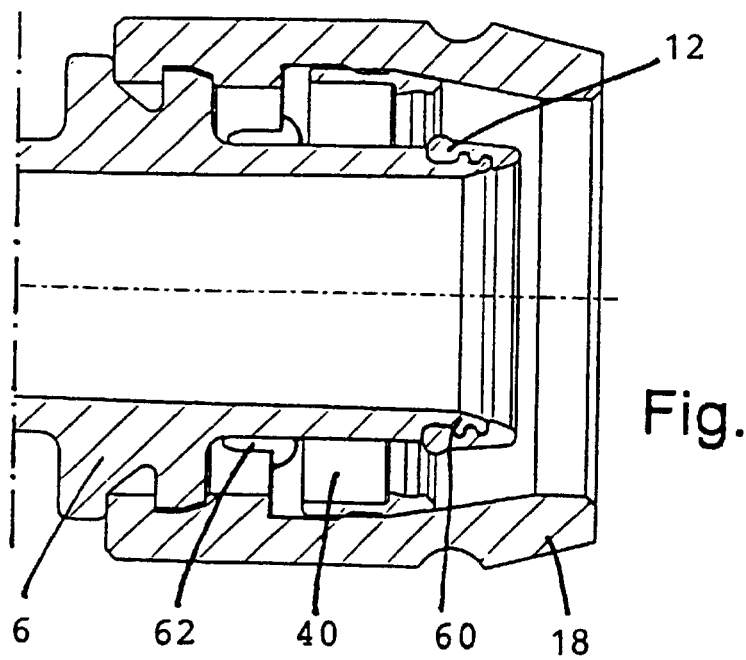
FIG. 3 is a longitudinal section through another specific embodiment of the plug-in coupling of the invention.

FIG. 3 shows a specific embodiment of the plug-in coupling according to the invention, which can be designed as a double coupling, only half of which is shown. The sealing ring 12, which fits against the interior surface of pipe end to be inserted, is arranged in the area of the free end 60 of the base body 6. The annular body 18 comprises a projection 62, which in conjunction with a clamping element of the locking ring 40, which will be further described below, produces a quick and/or additional prestressing or claw fixation of the radially inwardly located pipe end. In other respects, the description of the first embodiment of the plug-in coupling applies correspondingly to this embodiment.

Figure 4:
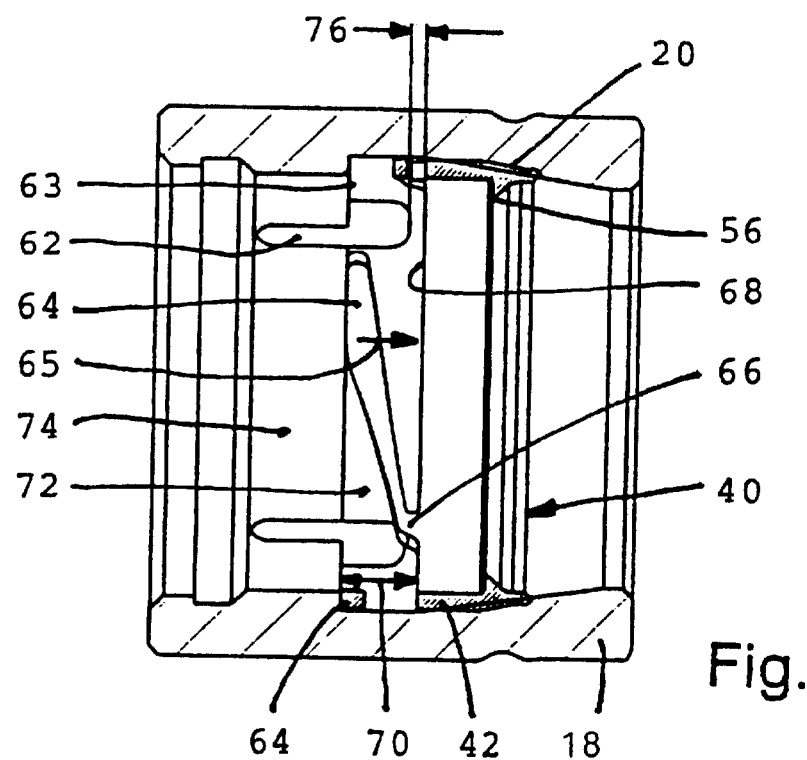
FIG. 4 is a longitudinal section through the annular body and the locking ring of an embodiment similar to that shown in FIG. 3.

FIG. 4, in an axial plane, shows an embodiment of the annular body 18 and the clamping ring 40, which is slightly modified compared to that depicted in FIG. 3. The annular body 18 comprises a radially inwardly pointing step or annular collar 63 against which the elastic clamping elements 64 of the locking ring 40 are seated. Thus, the clamping 64 elements press the locking ring 40 in the direction of arrow 65 against the locking surface 20 of the annular body 18 with a predefined initial stress. Manufacturing tolerances are thus advantageously compensated. The prestressing in the context of the invention is defined in such a way that the pipe end can be inserted into the plug-in coupling virtually without any increase in the insertion resistance. Without the clamping elements 64, tight manufacturing tolerances would have to be met for the annular body and the locking ring as well as for the pipe end to be inserted in order to avoid, on the one hand, an excessively high insertion resistance for the pipe end if the inside diameter of the first inner holding claw 56 were too small and to assure, on the other hand, a secure fit and immediate engagement of the holding claw 56 with the inserted pipe end.

The corresponding clamping element 64 is integrally connected with the locking ring 40 by a short rib 66 in the area of the axial end face 68. As may be seen, the axial end face 68 is spaced at a predefined distance 70 from the annular collar 63. The clamping element or elements 64 is/are arranged in the axial area 72 thus defined. As shown, the projections 62 extend into this axial area 72 as well as into the adjacent interior area 74 of the annular body 18 facing away from the locking ring. Axial area 72 has a larger inside diameter than the interior area 74 of the annular body 18, which adjoins it via the step or the annular collar 63. It should furthermore be expressly noted that the elastic clamping element 64 is arranged axially to the side of the locking ring 40, which side is opposite the aforementioned first and second part of the locking ring 40. The projections 62 advantageously end at a predefined axial distance 76 in front of the end face 68, so that a secure axial orientation of the locking ring 40 is assured and any tilting or inclining of the locking ring within the annular body 18 is excluded. When a pipe end is inserted, the axial distance 76 can approach zero, so that a coaxial alignment of the locking ring 40 within the annular body 18 is advantageously assured.

Figure 5:
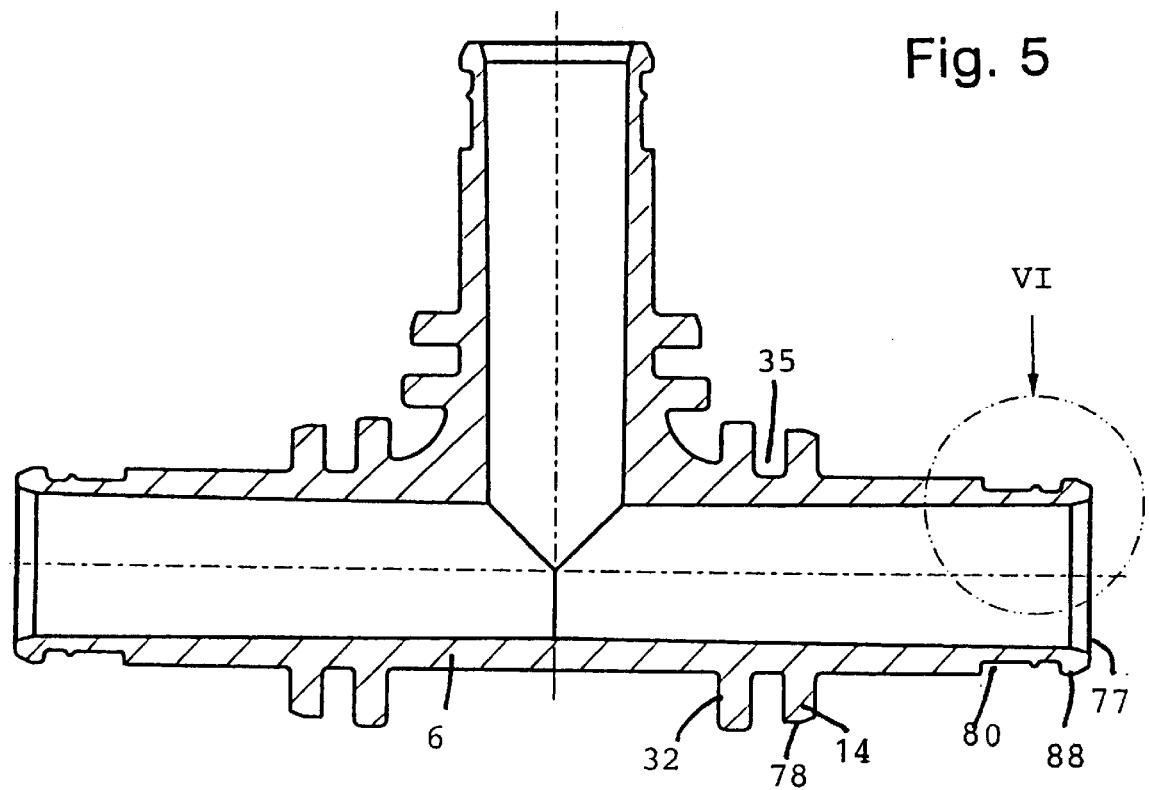
FIG. 5 is a section through another exemplary embodiment of the base body.

FIG. 5 shows a section through another illustrative embodiment of the base body 6, which is designed as a T-fitting for connecting three pipes. The parts of the base body 6 associated with each pipe are all the same, so that the following description applies correspondingly to all three parts of the fitting. The base body 6 comprises an outer annular space 35, which is advantageously arranged between the two radial, axially spaced ribs or rings 14, 32. These ribs 14, 32 can be present in the form of rings that are closed around the circumference or as a plurality of segments with defined distances therebetween in circumferential direction.

The annular space 35 is provided to lock in position the cap, not shown, by means of which the pipe end can be connected with the base body 6 and which ends in the area of the ribs 14, 32. The rib 14 facing the free end 77 of the base body 6 advantageously has a smaller outside diameter than the other rib 32, which is axially spaced further apart from the end 77. Furthermore, the exterior surface 78 of the rib 14 that is closest to the free end 77 is sloped or flattened in the direction toward the free end 77, so that connecting means, snap-in elements or the like of said cap can be readily pushed over the rib 14 to engage with the annular groove 26 to fix the cap axially.

Figure 6:
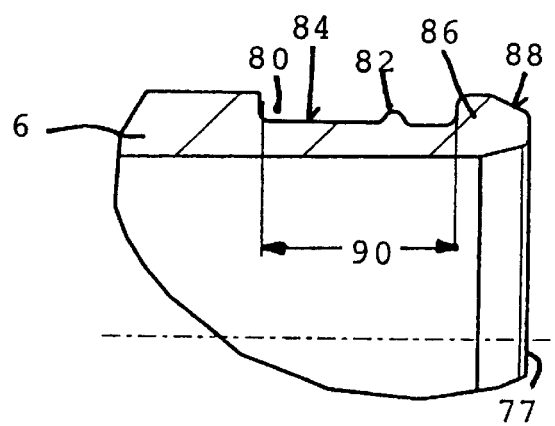
FIG. 6 is an enlarged detail view VI according to FIG. 5.

FIG. 6 shows an enlarged detail V according to FIG. 5. The fitting body 6 comprises a first annular groove 80 for a sealing ring (not shown). A radially outwardly pointing profile ring 82 is provided on the bottom 84 of the profile groove 80. This profile ring 82 of the base body 6 engages with a corresponding annular groove of the flat sealing ring, which fixes said sealing ring securely to the base body 6. Between the annular groove 80 and the free end 77, the base body 6 comprises a radially outwardly pointing ring 86 by means of which the sealing ring is secured against shifting or dislodging as the pipe end is inserted.

The ring 86 has a beveled exterior surface 88 sloping toward the free end 77, which particularly advantageously serves as an insertion aid and centers the pipe end relative to the base body. In interaction with the ring 86 according to the invention and the profile ring 82, this reliably prevents any undesirable shifting of the flat sealing ring as the pipe end is inserted into the plug-in coupling. Alternatively, other corresponding profile rings may also be provided within the scope of the invention. The bottom 84 of the annular groove 80 preferably has a predefined axial extension 90 and is advantageously embodied as a cylindrical surface that is coaxial to the longitudinal axis 16. The axial extension 90 of the annular groove 80 is advantageously much larger than its radial depth.

Figure 7:
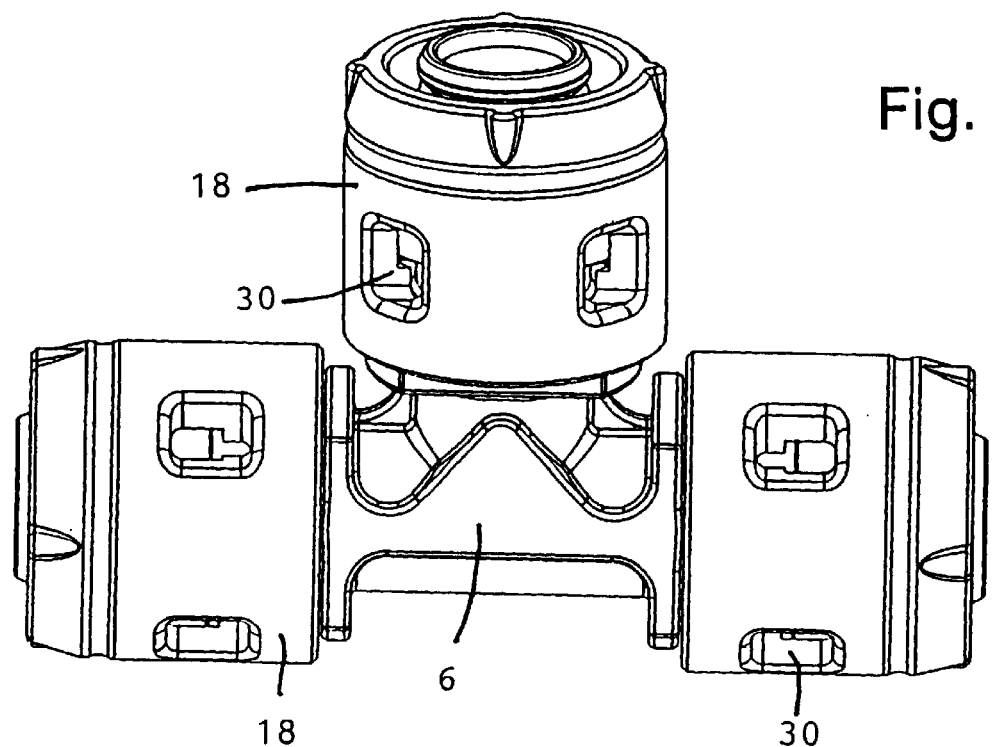
FIG. 7 is a view of a plug-in coupling embodied as a T-type connector.

FIG. 7 depicts a plug-in coupling according to the invention constructed as a T-unit or tee with the base body 6 corresponding to that shown in FIG. 5. As may be seen, the plug-in coupling comprises three eyes or annular bodies 18 on the corresponding end of the base body 6. The annular bodies 18 comprise the aforementioned inspection windows 30, namely four each, which are uniformly distributed around the circumference. The inspection windows 30 are constructed as radial ports or openings and according to the invention permit visual inspection of the corresponding pipe end, which is inserted into the annular gap between the annular body 18 and the base body 6.

Figure 8:
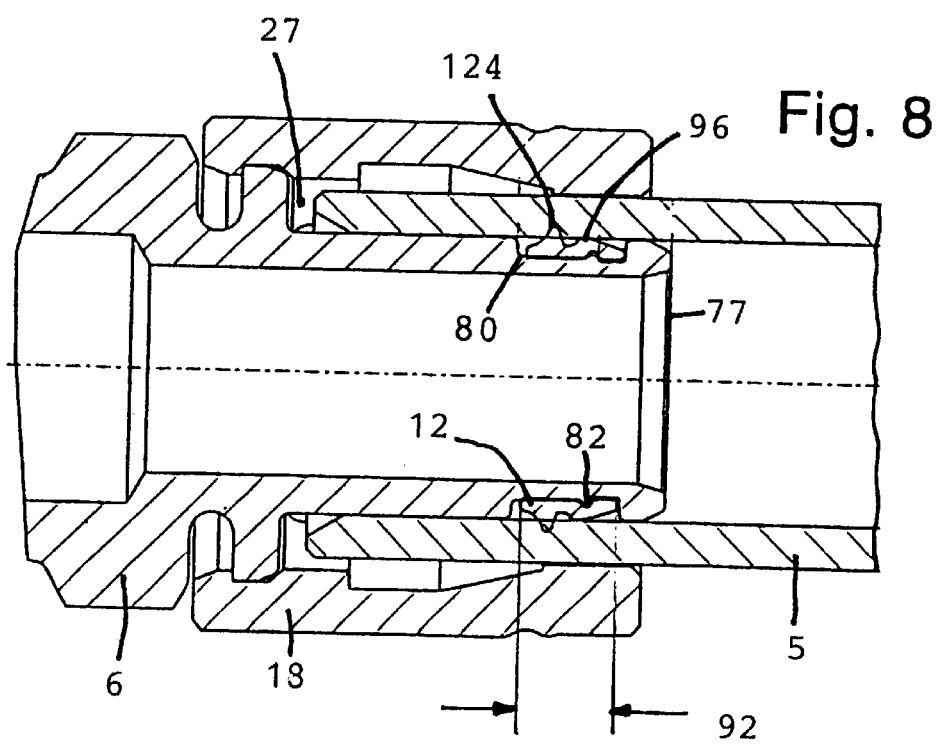
FIG. 8 is a section through a portion of the plug-in coupling together with the inserted pipe end.

FIG. 8 shows an axial longitudinal section of a portion of the plug-in coupling. The pipe end 5 is inserted into the axially extending annular gap 27 between the base body 6 and the annular body 18. The sealing ring 12 comprises a radially outwardly pointing sealing bead 124, which is depicted in its non-compressed state for the sake of simplicity. In fact, the sealing bead 124, which fits tightly against the interior surface of the pipe end 5, is deformed and/or compressed in such a way that it is located radially inwardly inside the annular groove 80. The sealing ring 12 according to the invention is a gasket with an axial length 92 that is greater by a predefined factor than the radial thickness of the sealing bead 124.

As will be described below, the sealing ring 12 has yielding spaces axially adjacent to the sealing bead 124 into which the sealing bead 124 is at least partially pressed as the pipe end is inserted. In the direction toward the free end 77 of the base body 6 the sealing ring 12 has a second sealing bead 96, which also fits tightly against the interior surface of the pipe end 5. This second sealing bead 96 particularly advantageously has a smaller outside diameter than the first-mentioned sealing bead 124. The outside diameter of the second sealing bead 96 provided according to the invention is at least equal to, but advantageously greater by a predefined amount than the inside diameter of the pipe end 5. This ensures a double seal by means of sealing ring 12 in a particularly advantageous manner, while low insertion resistance is nevertheless given due to the different and/or stepped definition of the diameters of the two sealing beads 96, 124.

According to the invention, the profile ring 82 is located in front of sealing bead 96 and/or sealing bead 124 as seen in insertion direction. The distance between the profile ring 82 and the free end 77 of the base body 6 is smaller than the distance between the sealing bead 96 and/or sealing bead 124 and the free end 77. As the pipe end is inserted, its end face first contacts the sealing bead 96, which is closest to the free end 77. This provides a particularly advantageous axial fixation of the sealing ring 12 inside the annular groove 80 of the base body 6. With further insertion, and particularly upon reaching the sealing bead 124, any displacement of the sealing ring 12 out of the annular groove 80 is reliably avoided.

FIGS. 9 and 10 show a further embodiment of the plug-in coupling which, similar to the embodiment depicted in FIG. 1, is designed as a double coupling and comprises the base body 6 and the two annular bodies or caps 18. The locking rings 40 are essentially similar in design to the embodiment shown in FIG. 4, but without the described clamping elements. The locking ring 40 comprises the first inner holding claw 56 and the second outer holding claw 58, which is associated with the conical locking surface 20 or 21 of the cap 18 or 19. The base body 6, in front of the free end 77, comprises a substantially cylindrical area 112 or an annular groove to receive the sealing ring 114.

The sealing ring 114 comprises a holding element 100, which overlaps the free end 77 of the base body. This holding element 100 is hook-shaped and comprises a radially inwardly directed contact surface 102 which fits against the free end 77. Even if friction is comparatively high, the sealing ring 114 is thereby prevented from being pulled along during assembly or mounting of the pipe end. This hook geometry of the holding element 100 and/or the conically expanded design of the interior surface 104 of the sealing ring 114, which is directed away, in particular, from the free end of the base body 6, results in a flow-enhancing embodiment of the inflow area. The area 112 has a smaller outside diameter than the additional adjacent area 116 toward the center of the coupling body. A step 118 is present between these areas.

At the free end 77, the coupling body 6 has a radially outwardly directed profile part 120, which engages a corresponding annular groove 122 of the sealing ring 114. In combination with the profile part 120 engaging with the annular groove 122 and the holding element 100, the sealing ring 114 is axially fixed in a functionally reliable manner. Furthermore, the sealing ring 114 has a radially outwardly projecting sealing bead or a sealing lip 124 which, after the pipe end has been inserted, fits tightly against the interior surface of the pipe end. The cap 18 comprises the at least one inspection window 30, which is preferably designed as a radially continuous opening. This makes it readily possible during assembly to verify whether the pipe end has been fully inserted into the plug-in coupling. Even after assembly, a simple visual inspection can verify at any time whether the pipe end is still completely and properly fixed within the plug-in coupling.

Figure 11:
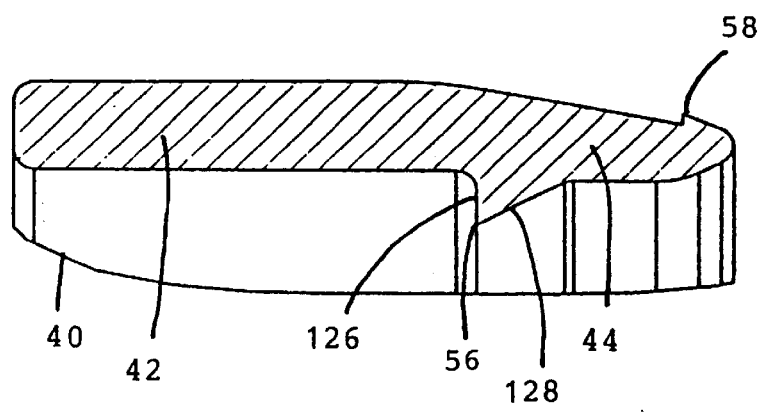
FIG. 11 is an enlarged view of the locking ring according to FIG. 9.

FIG. 11 is a partial and enlarged view of the locking ring 40 with the radially inwardly pointing first holding claw 56. The locking ring is preferably a rolled profile, particularly made of spring steel. Within the scope of the invention, the locking ring 40 can also be made of a different material, particularly plastic, which is harder and/or tougher than the material of the pipe end to be inserted. The inner holding claw 56 is provided at least approximately within the transition area between the first part 42 and the second part 44 of the locking ring 40. This first part 42 has a substantially cylindrical exterior surface, whereas the second part 44 has a substantially conical exterior surface that tapers toward the second holding claw 58.

The holding claw 56 has an interior surface 126 directed toward the first part 42, which preferably lies in an essentially radial plane. The holding claw 56 furthermore has a second interior surface 128 associated with the second part 44. These two interior surfaces 126, 128 form an acute angle. This advantageously fixes the inserted pipe in a functionally reliable manner. During insertion, the pipe end can easily be pushed over the second angled interior surface 128. The surfaces of the two outer holding claws 58 are also arranged in such a way that they form an acute angle with respect to each other to ensure that they securely claw into the associated locking surface of the cap.

Figure 12:
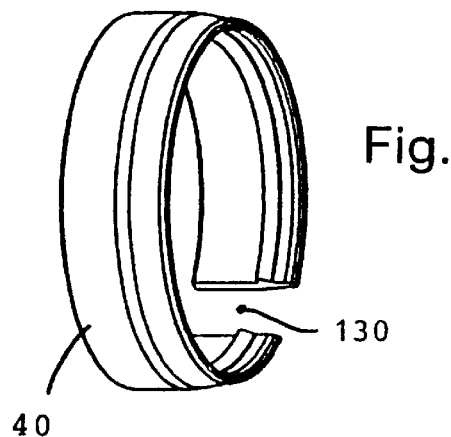
FIG. 12 is a perspective view of the locking ring.

FIG. 12 is a perspective view of the locking ring 40 in which the axial gap or slot 130 may be readily seen. The slot 130 makes it simple to mount the locking ring 40 inside the cap.

Figure 13:
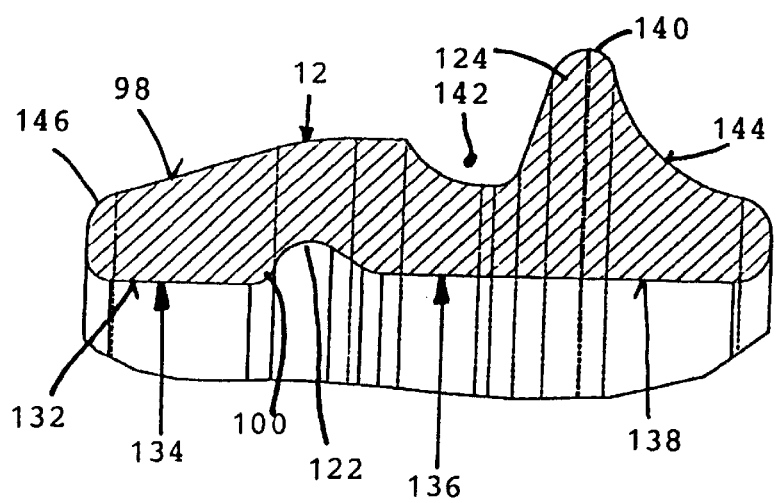
FIG. 13 is an enlarged view of the sealing ring according to FIG. 9.

FIG. 13 is a partial and enlarged view of the sealing ring 112 with the aforementioned annular groove 122 with which the above described profile ring of the base body engages. The holding element 100 in this specific embodiment of the sealing ring 112 has a substantially cylindrical interior surface 132. The diameter 134 of the interior surface 132 is preferably smaller by a predefined factor than the diameter 136 of the remaining interior surface 138 of the sealing ring. The sealing bead or sealing lip 124 has a basically triangular cross section with the radially outward lying tip 140 being rounded.

Adjacent the sealing bead 124, a yielding space 142 is provided in whose area the sealing ring has a reduced wall thickness. On the other side, the exterior surface 144 of the sealing lip 124 is advantageously concave. Thus, the sealing lip 124 can easily yield as the pipe end is being inserted, so that insertion resistance is low. At the front end 146 of the sealing ring, the exterior surface 98 is tapered, particularly conically tapered, so that the pipe end can be easily inserted into the plug-in coupling while being simultaneously centered.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, wherein the locking ring has at least one additional clamping element which lies against an interior surface of the annular body, and wherein the clamping element is arranged in the area of an axial end face of the locking ring.

2. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, wherein the locking ring has at least one additional clamping element which lies against an interior surface of the annular body, and wherein an axial end face of the locking ring is spaced at a predetermined distance from an annual collar of the annular body against which the at least one clamping element lies.

3. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, and wherein the annular body has at least one axial projection, and an axial distance is provided between the axial end of the projection and an axial end face of the locking ring which can be reduced as the pipe end is inserted.

4. A plug-in coupling according to claim 3, wherein the annular body has a plurality of projections distributed around its circumference.

5. A plug-in coupling according to claim 4, wherein the axial end face of the locking ring is supported against the axial projections.

6. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, and wherein the base body has at least one profile ring; the sealing ring has at least one annular groove, and the profile ring and annular groove correspond and engage one another.

7. A plug-in coupling according to claim 6, wherein the base body has a first radially outwardly directed rib with which a connecting element of the annular body engages.

8. A plug-in coupling according to claim 7, wherein the first rib is formed as a limit stop for the face of the pipe end.

9. A plug-in coupling according to claim 6, wherein the annular body projects axially over the pipe end with a connecting element.

10. A plug-in coupling according to claim 6, wherein the locking ring is provided with an inner holding claw, which can be pressed into the exterior surface of the pipe end.

11. A plug-in coupling according to claim 10, wherein the inner holding claw is arranged in the area of a substantially cylindrical interior surface of the locking ring.

12. A plug-in coupling according to claim 6, wherein the locking ring is provided with an outer holding claw, which engages the locking surface of the annular body.

13. A plug-in coupling according to claim 12, wherein said locking surface is a conical surface.

14. A plug-in coupling according to claim 12, wherein the outer holding claw is arranged in a front area of the locking ring on a conically tapering exterior surface.

15. A plug-in coupling according to claim 6, wherein the locking ring comprises a first part that is substantially cylindrical, and a second part that tapers toward an end area of the base body, and an exterior surface of said second part contacts the locking surface of the annular body under initial stress.

16. A plug-in coupling according to claim 6, wherein the locking ring has an exterior surface and an interior surface arranged at a predefined aperture angle.

17. A plug-in coupling according to claim 16, wherein the locking ring has an exterior surface and an interior surface on said second part which are arranged at a predefined aperture angle.

18. A plug-in coupling according to claim 16, wherein the aperture angle between the exterior and interior surfaces of the locking ring is greater than a second aperture angle between the locking surface of the annular body and the exterior surface of the pipe end.

19. A plug-in coupling according to claim 6, wherein the locking ring is provided with an inner holding claw, which can be pressed into the exterior surface of the pipe end and an outer holding claw, which engages the locking surface of the annular body, and the inner holding claw and the outer holding claw have surfaces which form an acute angle.

20. A plug-in coupling according to claim 6, wherein the annular body comprises at least one inspection window formed as an opening or a transparent area in the area in which the pipe end is located when completely inserted.

21. A plug-in coupling according to claim 20, wherein the inspection window is arranged in an area of a coupling bottom.

22. A plug-in coupling according to claim 20, wherein the base body has a first radially outwardly directed rib with which a connecting element of the annular body engages, and the inspection window is arranged axially in front of said first rib.

23. A plug-in coupling according to claim 20, wherein the inspection window is arranged outside an inner area of the plug-in coupling sealed by the sealing ring.

24. A plug-in coupling according to claim 20, wherein the inspection window is arranged axially between the sealing ring, which lies against the inner surface of the pipe end, and a coupling bottom.

25. A plug-in coupling according to claim 20, wherein the base body has a first radially outwardly directed rib which is contacted by an axial end face of the inserted pipe end, and the inspection window is arranged axially between the sealing ring, which lies against an inner surface of the pipe end, and said first rib.

26. A plug-in coupling according to claim 6, wherein the locking ring has at least one additional clamping element which lies against an interior surface of the annular body.

27. A plug-in coupling according to claim 26, wherein the at least one clamping element is arranged on a substantially cylindrical part of the locking ring.

28. A plug-in coupling according to claim 26, wherein three clamping elements are distributed around the circumference and extend over a predefined angular area.

29. A plug-in coupling according to claim 26, wherein the clamping element is connected with the locking ring via an axially oriented rib.

30. A plug-in coupling according to claim 26, wherein a clearance is present between the clamping element and an axial end face of the locking ring.

31. A plug-in coupling according to claim 26, wherein the clamping element, which is elastic, is arranged in such a way that the locking ring is prestressed axially, radially or both.

32. A plug-in coupling according to claim 6, wherein the locking ring has at least one additional clamping element which lies against an annular collar.

33. A plug-in coupling according to claim 6, wherein an exterior surface of a clamping element lies against the interior surface of the annular body.

34. A plug-in coupling according to claim 33, wherein the exterior surface of the clamping element lies against a projection of the annular body.

35. A plug-in coupling according to claim 6, wherein the sealing ring has an exterior surface that is inclined relative to the longitudinal axis.

36. A plug-in coupling according to claim 6,
wherein at least one yielding space is provided adjacent a sealing lip of the sealing ring.

37. A plug-in coupling according to claim 6, wherein the sealing ring has at least two sealing beads which are disposed axially at a distance from one another.

38. A plug-in coupling according to claim 37, wherein the second seal bead, which is at a shorter distance from the base body than the first sealing bead, has a smaller external diameter than the first sealing bead.

39. A plug-in coupling according to claim 6,
wherein the sealing ring has a yielding space between at least two sealing beads.

40. A plug-in coupling according to claim 39, wherein on a side away from the yielding space a surface of one of the sealing beads is concave.

41. A plug-in coupling according to claim 6,
wherein the base body is constructed in one piece and has an annular part with an annular groove, which is disposable within the pipe end, and a first radially outwardly directed rib with which a connecting element of the annular body engages.

42. A plug-in coupling according to claim 6, wherein an end of the sealing ring is tapered to allow the pipe end to be inserted and simultaneously centered.

43. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, and
wherein the sealing ring has a holding element with a support surface that is inclined at a predefined angle to the longitudinal axis.

44. A plug-in coupling according to claim 43, wherein said holding element is an annular element.

45. A plug-in coupling according to claim 43, wherein the holding element overlaps the free end of the base body.

46. A plug-in coupling according to claim 43, wherein said holding element is hook-shaped.

47. A plug-in coupling according to claim 43, wherein the holding element has an approximately conically inclined interior surface.

48. A plug-in coupling according to claim 43, wherein a supporting surface of the holding element lies against a free end of the base body.

49. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, and
wherein an annular groove of the base body has, in a bottom, a profile ring engaging a corresponding annular groove of the sealing ring.

50. A plug-in coupling according to claim 49, wherein an axial extent of a bottom of the annular groove is greater than an axial length of the sealing ring.

51. A plug-in coupling comprising a base body, a sealing ring, a locking ring, and an annular body which can be connected with the base body, in which a pipe end can be locked into position by the locking ring, wherein the pipe end can be inserted into an axial annular gap between the base body and the annular body, the sealing ring fits tightly against the interior surface of the pipe end, and the annular gap accommodates the locking ring, which fits under initial stress against a locking surface of the annular body and against the exterior surface of the inserted pipe end, and
wherein the sealing ring has an exterior surface that is inclined relative to the longitudinal axis,
wherein at least one yielding space is provided adjacent a sealing lip of the sealing ring and axially separated from the locking ring, and
wherein an inner surface of the annular body radially opposite the at least one yielding space is cylindrical.

52. A plug-in coupling according to claim 51, wherein the locking ring is provided with an inner holding claw, which can be pressed into the exterior surface of the pipe end.

53. A plug-in coupling according to claim 52, wherein the inner holding claw is arranged in the area of a substantially cylindrical interior surface of the locking ring.

54. A plug-in coupling according to claim 51, wherein the locking ring comprises a first part that is substantially cylindrical, and a second part that tapers toward an end area of the base body, and an exterior surface of said second part contacts the locking surface of the annular body under initial stress.

55. A plug-in coupling according to claim 51, wherein the annular body comprises at least one inspection window formed as an opening or a transparent area in the area in which the pipe end is located when completely inserted.

56. A plug-in coupling according to claim 55, wherein the inspection window is arranged outside an inner area of the plug-in coupling sealed by the sealing ring.

57. A plug-in coupling according to claim 55, wherein the inspection window is arranged axially between the sealing ring, which lies against the inner surface of the pipe end, and a coupling bottom.

* * * * *